United States Patent
Duschesne et al.

(10) Patent No.: US 8,219,137 B2
(45) Date of Patent: Jul. 10, 2012

(54) METHOD FOR CONTROLLING INTERFERENCE GENERATED BY A MOBILE STATION ON NEIGHBOR BASE STATIONS

(75) Inventors: Amelie Duschesne, Paris (FR); Emmanuel Lemois, Paris (FR)

(73) Assignee: Sequans Communications, Paris la Defense Cedex (FR)

( * ) Notice: Subject to any disclaimer, the term of this patent is extended or adjusted under 35 U.S.C. 154(b) by 686 days.

(21) Appl. No.: 12/399,905

(22) Filed: Mar. 6, 2009

(65) Prior Publication Data
US 2009/0233594 A1 Sep. 17, 2009

(30) Foreign Application Priority Data
Mar. 12, 2008 (EP) .................................... 08290239

(51) Int. Cl.
H04B 15/00 (2006.01)
(52) U.S. Cl. ....................................... 455/522; 455/63.1
(58) Field of Classification Search ................. 455/63.1, 455/501, 522, 33.1, 54.1
See application file for complete search history.

(56) References Cited

U.S. PATENT DOCUMENTS

| 5,603,093 A | 2/1997 | Yoshimi et al. |
| 5,799,004 A * | 8/1998 | Keskitalo et al. ............. 370/335 |
| 7,647,025 B2 * | 1/2010 | Rao .............................. 455/63.1 |
| 2010/0278063 A1 * | 11/2010 | Kim et al. ..................... 370/252 |

* cited by examiner

Primary Examiner — Dinh T. Le
(74) Attorney, Agent, or Firm — Bryan A. Santarelli; Graybeal Jackson LLP

(57) ABSTRACT

The present invention concerns a method for controlling the interference level generated by a mobile station comprising at least steps: selecting at least one neighbor base station; estimating a first attenuation value between the mobile station and a current base station, and at least a second attenuation value between the mobile station (MS) and the neighbor base station; estimating an interference level: $I\_level = BS0\_RSS + L0 - L$ wherein $BS0\_RSS$ is a first received signal strength at the base station, from the mobile station, $L0$ is the first attenuation value, and $L$ is one second attenuation value estimated in preceding step, comparing the interference level to a reference interference level, and according to the result of the comparison, sending to the mobile station at least information relative to a maximum transmitted signal strength.

5 Claims, 3 Drawing Sheets

METHOD FOR CONTROLLING INTERFERENCE GENERATED BY A MOBILE STATION ON NEIGHBOR BASE STATIONS

PRIORITY CLAIM

The present application claims the benefit of European Patent Application Serial No. 08290239.6, filed Mar. 12, 2008, which application is incorporated herein by reference in its entirety.

TECHNICAL FIELD

An embodiment of the present invention pertains to wireless communication, and more specifically to a method for controlling uplink interference level generated by a mobile station communicating with a current base station, on at least a neighbor base station in a wireless communication system. The method comprises at least a step of selecting at least one neighbor base station, and a step of estimating an attenuation level between the mobile station and the current base station, and at least an attenuation level between the mobile station and the neighbor base station.

BACKGROUND

A wireless communication network comprises a plurality of zones or cells, for example C0 to C18 in FIG. 1, each zone may comprise a base station. The base station with which a mobile station does communicate, is called the current (or serving) base station, and the other base stations of the network with which the mobile station does not communicate, are called the neighbor base stations. For example in FIG. 2, the base station BS0 of cell C0 with which the mobile station communicates is the current base station, and the other base stations BSi, i being an integer at least equal to 1 and being the reference number of the cells, are the neighbor base stations. Generally, signals sent in such a network comprises a plurality of frames, each of which comprises data and information relative to the sender station (mobile station or base station) and at least one recipient station (mobile station or base station) of the data. The communication between a base station and a mobile station is bidirectional: transmission from the base station to the mobile station is referred to as downlink, and transmission from a mobile station to a base station is referred to as uplink. Therefore, downlink signals coexist with uplink signals, and particularly in uplink communication, a signal transmitted by the mobile station MS to the current base station BS0 is received by the current base station BS0 and also by the neighbor base stations BSi. In such a network, the receiving performance of the neighbor base station is limited by a thermal noise and a co-channel interference generated by the mobile station on the neighbor base station, and the capacity of the uplink is reduced. For example, in FIG. 2, considering the cell C0, the mobile station MS communicates with the current base station BS0, and interferes on the neighbor base station BS1 to BSi. Therefore, the level of the uplink interference generated by the mobile stations on the neighbor base stations in a wireless communication network has to be controlled and limited.

The control of the uplink interference can be performed in different ways. For example, a solution, referred to as frequency planning, consists of deploying base stations on the network in such a way that two neighbor base stations do not use the same carrier frequency and this way do not interfere with one another, though this solution leads to important deployment costs. In another solution, each base station filters part of the interference generated by the mobile stations located in the neighboring cells while demodulating the received signal, but this interference cancellation technique requires an increased number of receiving antennas at the base station side and a complex receiving signal processing. In another solution, a base station of a cell controls the average interference level generated by all the mobile stations present in the cell by limiting the number of users that can be allowed in the cell, but this solution does not allow identifying the mobile station which is creating more interference on neighbor cells than the other mobile stations, and thus penalizes mobile stations that are not the source of the interference. In the solution suggested by the U.S. Pat. No. 5,603,093, which is incorporated by reference, a plurality of field intensities and bit error rate (BER) of downlink radio wave are measured at different measurement timing, and are used in a complex statistical calculation. Moreover, an accurate bit error rate measurement requires long time to be obtained, and in addition, this solution needs to wait for an algorithm to converge in order to know the state of the interference.

SUMMARY

An embodiment of the present invention overcomes the above-described disadvantages by proposing a less complex method for controlling the interference level generated by a mobile station on the network.

For this purpose, an embodiment of the invention is a method for controlling the interference level generated by a mobile station, communicating with a current base station, on at least a neighbor base station in a wireless communication system.

The method comprises at least steps:

A: selecting at least one neighbor base station;

B: estimating a first attenuation value representative of signal attenuation level between the mobile station and the current base station, and at least a second attenuation value correlated to one neighbor base station selected in step A and representative of signal attenuation level between the mobile station and the correlated neighbor base station;

C': estimating a first received signal strength by measuring power level of signal received by the current base station from the mobile station;

C'': estimating an interference level from the relation: I_level=BS0_RSS+L0−L, in which I_level is the interference level, BS0_RSS is the first received signal strength representative of power of signal received by the current base station from the mobile station, L0 is the first attenuation value, and L is one second attenuation value estimated in step B, D: comparing the interference level to a reference interference level, and according to the result of the comparison, sending to the mobile station at least information relative to a maximum transmitted signal strength for the mobile station.

Thus, the mobile station can set its transmitted signal strength equal or lower than the maximum transmitted signal strength in order to reduce the interference level generated on the neighbor station of the network.

Advantageously, the wireless communication network may comprise one or a plurality of neighbor stations. In step A, a plurality of neighbor base stations may be selected. In step B, the first attenuation value and a plurality of second attenuation values may be estimated, each second attenuation value among the plurality of second attenuation values being correlated to one neighbor base station among the plurality of neighbor base stations, and being representative of signal attenuation level between the mobile station and the correlated neighbor base station. In step C", L may be the lowest second attenuation value among the plurality of estimated second attenuation values.

Therefore, a given current base station of a cell can identify the mobile station present in the cell that would generate too much interference and can solve the issue by limiting the transmitted signal strength of this mobile station. Thus, the given current base station controls the uplink transmission of this mobile station without penalizing the other mobile stations present in the cell, and the overall capacity of the network is maximized.

Preferably, the first attenuation value is estimated from the relation:

$L0 = BS0\_TSS - MS\_RSS0$, in which

L0 is the first attenuation value,

BS0_TSS is a first transmitted signal strength representative of power of signal transmitted by the current base station, and MS_RSS0 is a second received signal strength representative of power of signal received by the mobile station from the current base station.

For example, each second attenuation value is estimated from the relation:

$Li = BSi\_TSS - MS\_RSSi$, in which

Li is the second attenuation value,

BSi_TSS is a second transmitted signal strength representative of power of signal transmitted by the correlated neighbor base station, and MS_RSSi is a third received signal strength representative of power of signal received by the mobile station from the correlated neighbor base station.

In an embodiment, wireless communication system may comprise a current base station, a mobile station and at least a neighbor base station.

The current base station may perform steps A, C', C" and D, and may send to the mobile station information relative to neighbor base stations selected in step A. The mobile station may perform the step B, may receive information relative to at least the first and second transmitted signal strengths BS0_TSS, BSi_TSS, and may send at least the first and the second attenuation level of step B to the current base station. The transmitted signal strength of the mobile station may be set according to the maximum transmitted signal strength. For example, the transmitted signal level of the mobile station should not exceed the maximum transmitted signal strength.

BRIEF DESCRIPTION OF THE DRAWINGS

Features and advantages of one or more embodiments of the invention will appear more clearly from the description of an embodiment of the invention made hereinafter, as an indication and by no means restrictive, with reference to the accompanying drawings, wherein.

DETAILED DESCRIPTION

Figure 2:
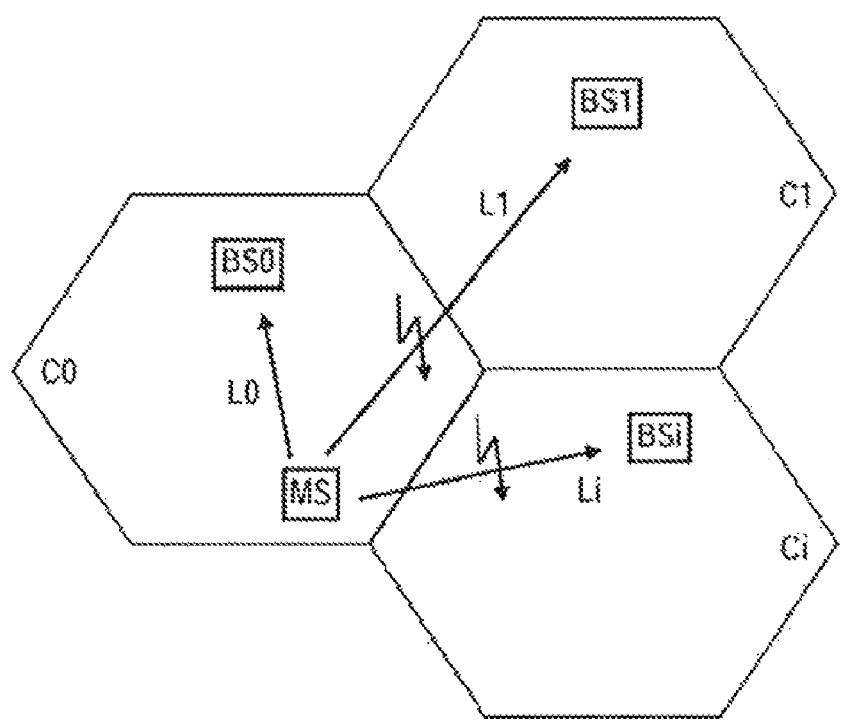
FIG. 2 shows cells with mobile station and base stations.

In a particular embodiment, to control the interference level generated by each mobile station present in a cell, on each neighbor base station, the signal attenuation level (or propagation loss) between a given mobile station and a given neighbor base station, and the signal attenuation level between the base station and the mobile station have to be estimated. Each mobile station and each base station transmit at their own transmitted signal level (TSS), and have a given received signal level (RSS) at each mobile station and base station receiver inputs of the network. For example, considering the cells C0 and Ci of the network, each of which comprising a base station, noted respectively BS0 and BSi (FIG. 2). The mobile station MS being in the cell C0, the base station BS0 is the current (or serving) base station and the base station BSi is the neighbor base station. The current base station BS0 transmits at a first transmitted signal level, noted BS0_TSS, and receives a signal from the mobile station MS with a first received signal strength BS0_RSS. The mobile station MS receives a signal from the current base station BS0 with a second received signal strength MS_RSS0, and receives a signal from the neighbor base station BSi with a third received signal strength MS_RSSi. The neighbor base station BSi transmits at a second transmitted signal strength MS_TSSi.

Figure 1:
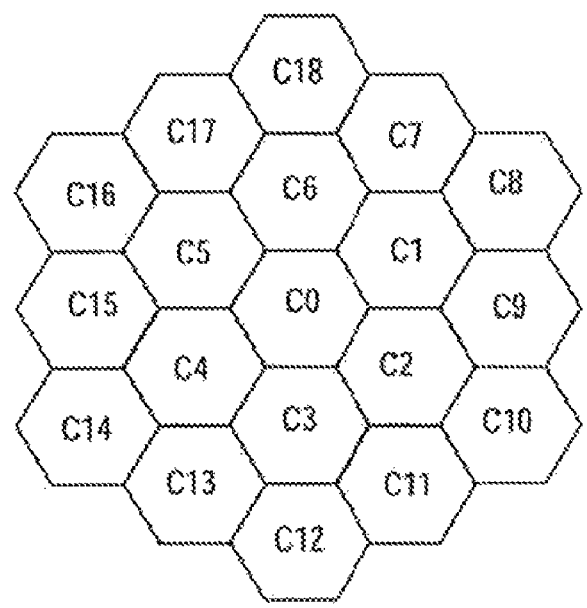
FIG. 1 shows cells of a wireless communication network.
Figure 3:
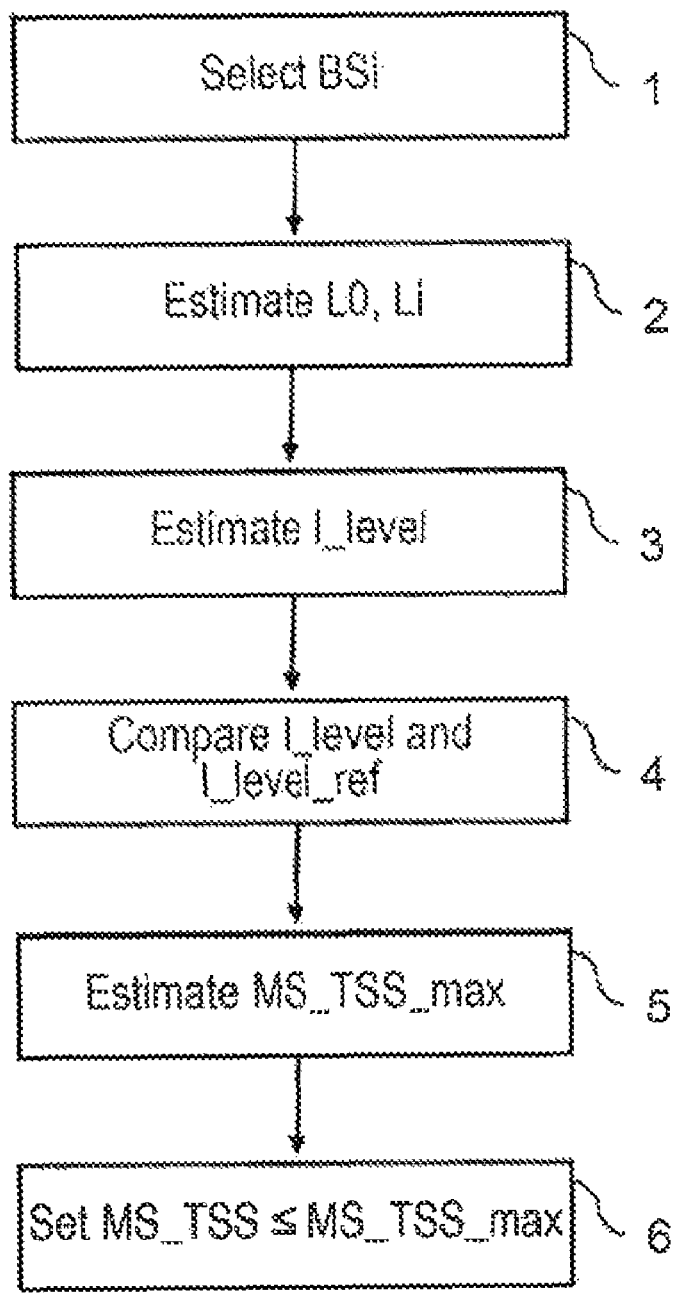
FIG. 3 shows a flowchart of the method according to a particular embodiment of the invention.

Referring to FIG. 3, the current base station BS0 may select (step 1 in FIG. 3) one or a plurality of neighbor base stations BSi and may send this selection to the mobile base station MS, for example by sending a list of neighbor base station identifiers. The current base station BS0 may also send to the mobile station MS the transmitted signal strength BS0_TSS of each selected neighbor base station BSi and its own transmitted signal strength BS0_TSS. For example, the current base station BS0 may select the neighbor base stations BSi which are at a distance lower than a maximum distance Dmax of the current base station. The current base station BS0 may also select the neighbor base stations BSi which are in the first two rings around of its cell C0, for example cells C1 to C18 in FIG. 1, the interference being considered as negligible beyond.

Figure 4:
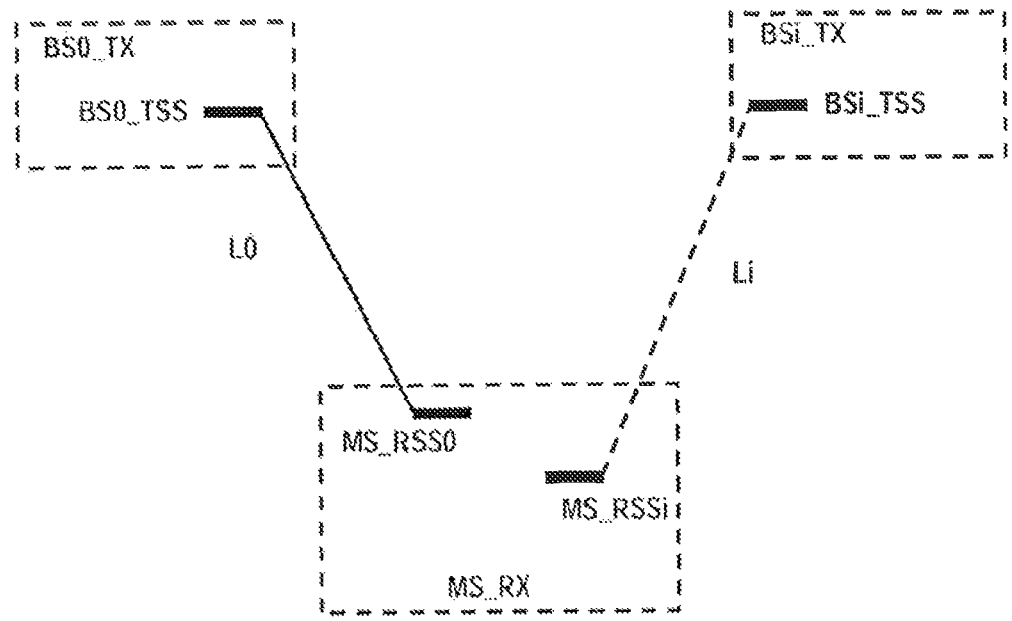
FIG. 4 shows propagation loss estimation.

For example, when only one neighbor base station BSi is selected, the mobile station MS may estimate a first attenuation value L0 and a second attenuation value Li correlated to the selected neighbor base station BSi (FIG. 4). The first attenuation value L0 is representative of signal attenuation level between the mobile station MS and the current base station BS0, and the second attenuation value Li is representative of signal attenuation level between the mobile station MS and the correlated neighbor base station BSi.

The first attenuation value L0 may be estimated (step 2 in FIG. 3) by the mobile station from the relation:

$L0 = BS0\_TSS - MS\_RSS0$ in which
L0 is the first attenuation value,
BS0_TSS is the first transmitted signal strength representative of power of signal transmitted by the current base station on one of its transmit antennas BS0_TX, BS0_TSS may have been sent to the mobile station by the base station, and
MS_RSS0 is the second received signal strength representative of power of signal received from the current base station by the mobile station on one of its receive antennas MS_RX, MS_RSS0 may have been estimated by the mobile station by measuring power level of signal received from the current base station.

The second attenuation value Li may be estimated (step 2 in FIG. 3) by the mobile station MS from the relation:

$$Li = BSi\_TSS - MS\_RSSi$$

in which
Li is the second attenuation value,
BSi_TSS is the second transmitted signal strength representative of power of signal transmitted by the selected neighbor base station on one of its transmit antennas BSi_TX, BS0_TSS may have been sent to the mobile station by the base station, and
MS_RSSi is the third received signal strength representative of power of signal received from the selected neighbor base station by the mobile station on one of its receive antennas MS_RX, MS_RSS0 may have been estimated by the mobile station by measuring power level of signal received from the selected neighbor base station.

As the mobile station MS receives signals from the current base station and from the neighbor base stations of the network, the mobile station MS can easily estimate the third received signal strength and the first received signal strength.

The mobile station MS may then report the first and second attenuation values L0, Li to the current base station BS0, for example in a message usually used for handover mechanism.

Given these propagation losses, the current base station BS0 is able to compute (step 3 in FIG. 3) the interference level I_level generated by the mobile station on the network by using the following relation:

$$I\_level = BS0\_RSS + L0 - L$$

in which
I_level is the interference level generated by the mobile station,
BS0_RSS is the first received signal strength representative of power of signal received by the current base station BS0 from the mobile station MS, BS0_RSS may have been estimated by the current base station by measuring power level of signal received from the mobile station,
L0 is the first attenuation value, and
L is the second attenuation value estimated.

The interference level I_level is then for example compared (step 4 in FIG. 3) to a reference interference level I_level_ref.

For example, the interference level I_level may not be more than a noise floor of the base station BS0 plus an additional margin. The noise level or noise floor may be estimated from the following relation:

$$noise\ floor = -134 + noise\ figure, wherein$$

−134 is a thermal noise for 10 kHz subcarrier spacing expressed in dBm, and
noise figure is a measure of the degradation of the signal to noise ratio caused by components in radio frequency (RF) signal chain and is typically equal to 6 dB.

The reference interference level can then be derived from the following relation:

$$I\_level\_ref = noise\ floor + margin,$$

wherein:
margin is equal to −3 dB and is representative of a margin used to compensate for estimation errors on L0 and L done by the mobile station.

Therefore, in this example, the reference interference level is equal to −131 dBm (I_level_ref=−134+6−3), and the interference level I_level may not exceed −131 dBm.

Of course, the reference interference level I_level_ref may be set differently. For example, the reference interference level can be set by an operator of the wireless communication network according to an average interference level measured in the network, or according to other network parameters. The reference interference level may also be update according to operating conditions of the network.

According to the result of the comparison between the interference level and the reference interference level, the current station may estimate (step 5 in FIG. 3) and send to the mobile station information relative to a maximum transmitted signal strength MS_TSS_max. The mobile station MS may then set (step 6 in FIG. 3) its transmitted signal strength MS_TSS according to this maximum transmitted signal strength MS_TSS_max.

Figure 5:
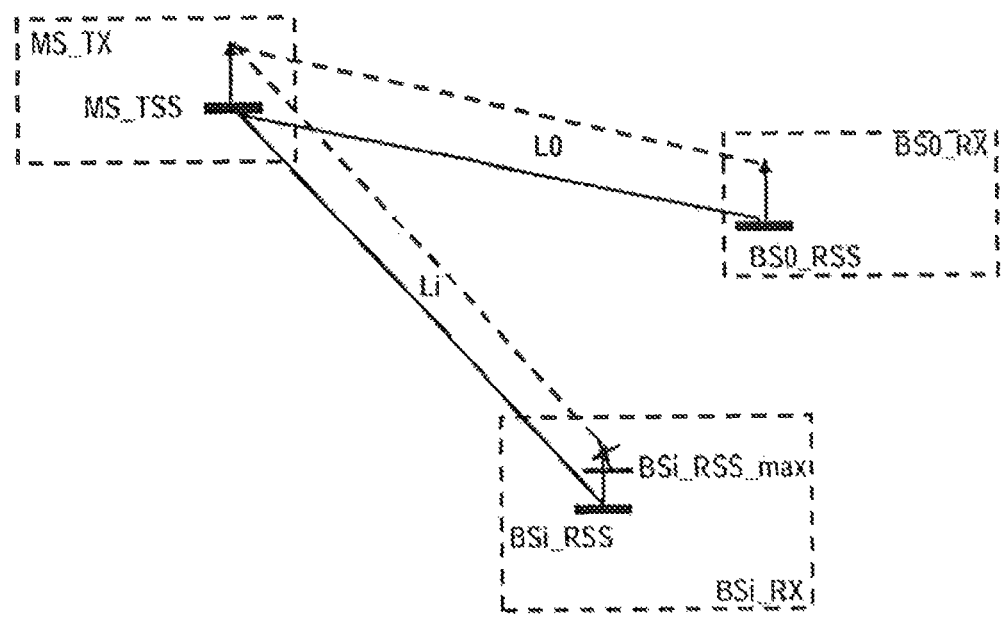
FIG. 5 shows optimization of the transmitted signal strength of the mobile station.

Thus, (FIG. 5) the current base station can optimize the transmit power level of the mobile station in order to maximize the power of the received signal strength BS0_RSS at a receive antennas BS0_RX of the current base station without exceeding the maximum power level of the signal received at a receive antenna BSi_RX of the neighbor base station. The received signal strength BSi_RSS of the neighbor base stations should not exceed a threshold named BSi_RSS_max. This threshold may be defined by an operator and may be set for example to the maximum level of noise a mobile station can generate without the neighbor base station to detect it, that is to say the noise floor of the neighbor base station.

When a plurality of neighbor base stations BSi are selected, the mobile station MS may estimate the first attenuation value L0 and a plurality of second attenuation values Li. In this case, each second attenuation value (Li) among the plurality of second attenuation values is correlated to one neighbor base station (BSi) among the plurality of neighbor base stations (for example L1 correlated with BS1, L2 correlated with BS2, Li correlated with BSi). Each second attenuation value Li is representative of signal attenuation level between the mobile station MS and the neighbor base station BSi with which it is correlated. Of course, the relation seen above used to estimate the second attenuation value may also be used to estimate each second attenuation value of the plurality of second attenuation values in this case. The mobile station MS may then report the first and all the second attenuation values L0, Li to the current base station BS0, and in this case, the lowest second attenuation value Li among the plurality of estimated second attenuation values is chosen as the parameter L in the relation used to estimate the interference level I_level, as seen above. Once the current base station BS0 has computed the interference level I_level generated by the mobile station, the current base station will be able to discriminate if this particular mobile station generates too much interference on the given neighbor station.

Accordingly, the current base station is able to reduce the transmit power of a mobile station generating high interference on a neighbor base station without penalizing any other user in the cell.

With this solution, there is no need to wait for a filtering to converge before applying a correction, and this gives a great stability and robustness to the network.

What is claimed is:

1. Method for controlling an interference level generated by a mobile station communicating with a current base station on at least a neighbor base station in a wireless communication system, comprising at least steps:
   A: selecting at least one neighbor base station;

B: estimating a first attenuation value representative of signal attenuation level between the mobile station and the current base station, and at least a second attenuation value correlated to said at least one neighbor base station selected in step A and representative of signal attenuation level between the mobile station and the correlated neighbor base station;

C': estimating a first received signal strength by measuring power level of a signal received by the current base station from the mobile station;

C": estimating the interference level from the relation:
I_level=BS0_RSS+L0−L, in which
I_level is the interference level,
BS0_RSS is the first received signal strength estimated in step C',
L0 is the first attenuation value estimated in step B, and
L is one of said at least a second attenuation values estimated in step B, D: comparing the interference level to a reference interference level, and according to the result of the comparison, sending to the mobile station at least information relative to a maximum transmitted signal strength for the mobile station.

2. Method according to claim 1,
Wherein, in step A, a plurality of neighbor base stations are selected,
wherein in step B, the first attenuation value and a plurality of second attenuation values are estimated, each second attenuation value among the plurality of second attenuation values being correlated to one neighbor base station among the plurality of neighbor base stations, and being representative of signal attenuation level between the mobile station and the correlated neighbor base station; and
wherein in step C", L is the lowest second attenuation value among the plurality of estimated second attenuation values.

3. Method according to claim 1, wherein the first attenuation value is estimating from the relation:

$L0 = BS0\_TSS - MS\_RSS0$, in which

L0 is the first attenuation value,
BS0_TSS is a first transmitted signal strength representative of power of signal transmitted by the current base station, and
MS_RSS0 is a second received signal strength representative of power of signal received by the mobile station from the current base station.

4. Method according to claim 1, wherein each second attenuation value is estimated from the relation:

$Li = BSi\_TSS - MS\_RSSi$, in which

Li is the second attenuation value,
BSi_TSS is a second transmitted signal strength representative of power of signal transmitted by the correlated neighbor base station, and
MS_RSSi is a third received signal strength representative of power of signal received by the mobile station from the correlated neighbor base station.

5. Method according to claim 1, wherein
the current base station performs steps A, C', C" and D, and sends to the mobile station information relative to neighbor base stations selected in step A;
the mobile station performs the step B, receives information relative to at least the first and second transmitted signal strengths BS0_TSS, BSi_TSS, sends the first and at least the second attenuation level of step B to the current base station;
the transmitted signal strength MS_TSS of the mobile station is set according to the maximum transmitted signal strength.

* * * * *